United States Patent (10) Patent No.: US 8,089,234 B2
Takizawa et al. (45) Date of Patent: Jan. 3, 2012

(54) MOTOR CONTROL DEVICE, MOTORED VEHICLE EQUIPPED THEREWITH, AND METHOD OF CONTROLLING A MOTOR

(75) Inventors: Keiji Takizawa, Toyota (JP); Hiroshi Aihara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 640 days.

(21) Appl. No.: 12/279,677

(22) PCT Filed: Apr. 3, 2007

(86) PCT No.: PCT/JP2007/057803
§ 371 (c)(1),
(2), (4) Date: Aug. 15, 2008

(87) PCT Pub. No.: WO2007/125743
PCT Pub. Date: Nov. 8, 2007

(65) Prior Publication Data
US 2008/0315814 A1 Dec. 25, 2008

(30) Foreign Application Priority Data

Apr. 24, 2006 (JP) ................................ 2006-119391

(51) Int. Cl.
*H02P 7/00* (2006.01)
(52) U.S. Cl. ........................ 318/432; 318/139
(58) Field of Classification Search ............. 318/139, 318/432, 434, 632
See application file for complete search history.

(56) References Cited

U.S. PATENT DOCUMENTS

| | | | | |
|---|---|---|---|---|
| 5,600,215 A | * | 2/1997 | Yamada et al. | 318/139 |
| 6,114,828 A | * | 9/2000 | Matsunaga et al. | 318/782 |
| 6,203,468 B1 | * | 3/2001 | Nitta et al. | 477/5 |
| 6,321,150 B1 | * | 11/2001 | Nitta | 701/29 |
| 2005/0021219 A1 | * | 1/2005 | Hartmann et al. | 701/110 |

FOREIGN PATENT DOCUMENTS

| | | |
|---|---|---|
| JP | 11-055803 A | 2/1999 |
| JP | 11-122703 A | 4/1999 |
| JP | 2000-79828 A | 3/2000 |
| JP | 2000-79831 A | 3/2000 |
| JP | 2000-79832 A | 3/2000 |
| JP | 2000-83301 A | 3/2000 |
| JP | 2000-184502 A | 6/2000 |
| JP | 2003-304604 A | 10/2003 |
| JP | 2004-180437 A | 6/2004 |
| JP | 2005-051834 A | 2/2005 |
| JP | 2005-312187 A | 11/2005 |
| WO | WO 2005/012026 A1 | 2/2005 |

* cited by examiner

*Primary Examiner* — Rina Duda
(74) *Attorney, Agent, or Firm* — Kenyon & Kenyon LLP

(57) ABSTRACT

When a motor temperature exceeds a threshold value, a torque control unit reduces a torque control value for a motor generator. A torque limitation control unit determines from torque control value and vehicular speed whether limiting a torque by the torque control unit should be alleviated, and if so the torque limitation control unit activates a signal for a predetermined period of time. When the signal is activated, the torque control unit stops reducing the torque control value and fixes the torque control value to be constant.

11 Claims, 3 Drawing Sheets

MOTOR CONTROL DEVICE, MOTORED VEHICLE EQUIPPED THEREWITH, AND METHOD OF CONTROLLING A MOTOR

This is a 371 national phase application of PCT/JP2007/057803 filed 03 Apr. 2007, claiming priority to Japanese Patent Application No. 2006-119391 filed 24 Apr. 2006, the contents of which are incorporated herein by reference.

TECHNICAL FIELD

The present invention relates generally to motor control devices, motored vehicles equipped therewith, and methods of controlling motors, and particularly to devices that control motors mounted in electric vehicles, hybrid vehicles, fuel cell vehicles and other motored vehicles as power source, motored vehicles equipped therewith, and methods of controlling motors.

BACKGROUND ART

Japanese Patent Laying-open No. 2003-304604 discloses a device driving a motor mounted as a source driving electric vehicles, hybrid vehicles, fuel cell vehicles and other various types of vehicles.

In this device, if a temperature detection means detects that the motor has a temperature equal to or higher than a temperature limit, a motor output control means limits the output of the motor. Herein a means for detecting a rate of change in temperature detects the rate of change in temperature of the motor and modifies a setting of the temperature limit in accordance with the rate of change detected.

More specifically, if the motor's rate of change in temperature is equal to or larger than a predetermined rate of change, the means for detecting a rate of change in temperature determines that the motor has a large increase in temperature, and accordingly the means sets the current temperature limit to be a first temperature limit, and when the motor attains the first temperature limit or higher the motor output control means limits the output of the motor.

In contrast, if the motor's rate of change in temperature is smaller than the predetermined rate of change, the means for detecting a rate of change in temperature determines that the motor has a small increase in temperature, and acccordingly the means sets the current temperature limit to be a second temperature limit higher than the first temperature limit, and when the motor attains the second temperature limit or higher the motor output control means limits the output of the motor.

This device allows a vehicle to run an increased distance without limiting the output of the motor, can protect the motor from high temperature, and also allows the motor to fully exhibit its performance.

Japanese Patent Laying-open No. 2003-304604, however, only limits the output of the motor in view of protecting the motor from high temperature. It does not give further consideration to how a vehicle would behaves and what state the vehicle would fall into when the motor's output is limited.

For example if a vehicle is running uphill and the motor's output is limited, and the vehicle can fail to climb up or stop, such state should first and most of all be avoided. The device disclosed in the publication does not limit the motor's output with such state considered: it only does so in view of protecting the motor. This provides a possibility that if the vehicle fails to climb up or stop, the driver may not be able to take any approach to handle the vehicle.

DISCLOSURE OF THE INVENTION

The present invention has been made to overcome such disadvantage and contemplates a motor control device that allows a vehicle's behavior and state to be considered to limit an output of a motor, and a motored vehicle equipped therewith.

The present invention also contemplates a method of controlling a motor, that allows a vehicle's behavior and state to be considered to limit the output of the motor.

In accordance with the present invention the present electric motor control device controls an electric motor generating a force driving a vehicle and it includes a torque limitation unit limiting a torque of the electric motor and a torque limitation alleviation unit outputting an instruction to the torque limitation unit for a predetermined period of time to pause limiting the torque, in accordance with a state of the vehicle after the torque limitation unit starts limiting the torque of the electric motor.

"A state of the vehicle" as referred to herein is a concept including states in general that affect the vehicle's behavior, such as the vehicle being reduced in acceleration force, failing to climb up or stop when the vehicle is running uphill, and the like.

Preferably the predetermined period of time is a period of time preset as a time allowing a driver of the vehicle to handle a state of the vehicle caused by limiting the torque.

Preferably the torque limitation alleviation unit outputs the instruction to the torque limitation unit when the electric motor provides a torque exceeding a first threshold value and the vehicle has a speed smaller than a second threshold value.

Preferably the torque limitation unit controls the torque of the electric motor to have a constant value when the torque limitation unit receives the instruction from the torque limitation alleviation unit.

Preferably after the predetermined period of time has elapsed, the torque limitation alleviation unit outputs an instruction to the torque limitation unit to resume limiting the torque.

Still preferably the electric motor control device further includes a notification unit outputting an alarm to a driver of the vehicle when limiting the torque is resumed.

Furthermore in accordance with the present invention the present motored vehicle includes: an electric motor generating a force driving the vehicle; a wheel mechanically coupled with an output shaft of the electric motor; and the electric motor control device as described above.

Furthermore in accordance with the present invention the present method is a method of controlling an electric motor generating a force driving a vehicle, and it includes the steps of: limiting a torque of the electric motor; and after the step of limiting is started, alleviating limiting the torque, in accordance with a state of the vehicle for a predetermined period of time.

Preferably the predetermined period of time is a period of time preset as a time allowing a driver of the vehicle to handle a state of the vehicle caused by limiting the torque.

Preferably the step of alleviating includes the substeps of: determining whether the electric motor provides a torque exceeding a first threshold value; determining whether the vehicle has a speed smaller than a second threshold value; and alleviating limiting the torque, for the predetermined period of time, when the electric motor provides the torque exceeding the first threshold value and the vehicle has the speed smaller than the second threshold value.

Preferably the step of alleviating includes controlling the torque of the electric motor to be constant only for the predetermined period of time.

Preferably the present method further includes the step of removing alleviating limiting the torque, after the predetermined period of time has elapsed.

Still preferably the present method further includes the step of outputting an alarm to a driver of the vehicle when alleviating limiting the torque is removed.

In the present invention, after the torque limitation unit starts limiting the torque of the electric motor, the torque limitation alleviation unit outputs an instruction to the torque limitation unit in accordance with the vehicle's state only for a predetermined period of time to alleviate limiting the torque. Thus, after limiting the torque of the electric motor is started, limiting the torque is alleviated in accordance with the vehicle's state.

Thus in accordance with the present invention when a limited torque results in the vehicle being in a state (such as failing to climb up or stop because of insufficient torque when the vehicle is running uphill) higher in priority in that it should be avoided, the driver can take some approach, such as pulling over to the road's shoulder, turning on a hazard flasher, applying brakes, and the like. This can provide an increased possibility of avoiding such state higher in priority in that it should be avoided.

Furthermore, limiting the torque can be alleviated in accordance with the vehicle's state only for a predetermined period of time, and protecting the electric motor is not interrupted.

Furthermore when alleviating limiting the torque is removed, an alarm can be output to the driver to ensure that the driver is notified that the torque is more severely limited.

BEST MODES FOR CARRYING OUT THE INVENTION

Hereinafter an embodiment of the present invention will more specifically be described with reference to the drawings. Note that in the figures, identical or like components are identically denoted and will not be described repeatedly.

Figure 1:
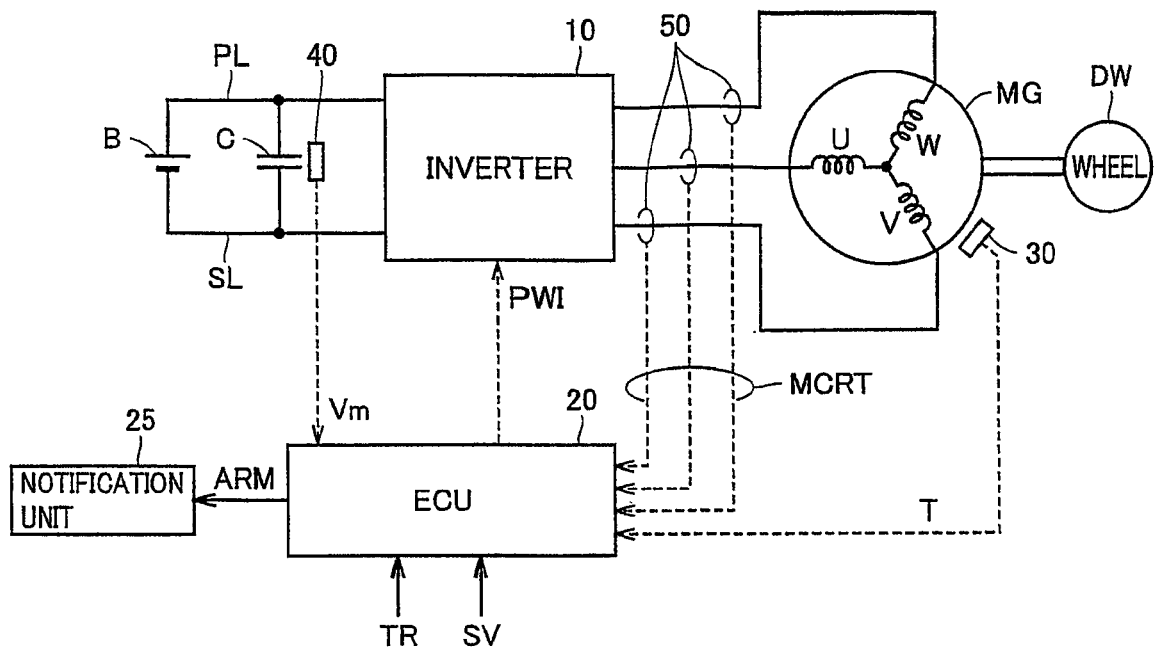
FIG. 1 is a block diagram generally illustrating a powertrain of a motored vehicle in an embodiment of the present invention.

FIG. 1 is a block diagram generally illustrating a powertrain of a motored vehicle in an embodiment of the present invention. With reference to FIG. 1, a motored vehicle 100 includes an electric storage device B, a power supply line PL, a ground line SL, a capacitor C, an inverter 10, a motor generator MG, and a wheel DW. Furthermore, motored vehicle 100 also includes an electronic control unit (ECU) 20, a notification unit 25, a temperature sensor 30, a voltage sensor 40, and a current sensor 50.

Electric storage device B has a positive electrode connected to power supply line PL and a negative electrode connected to ground line SL. Inverter 10 is connected to power supply line PL and ground line SL. Capacitor C is connected between power supply line PL and ground line SL in parallel with electric storage device B. Motor generator MG includes a Y hard wired, 3 phase coil as a stator coil, and is connected via a 3 phase cable to inverter 10. Motor generator MG has an output shaft mechanically coupled with a shaft of rotation of wheel DW. In other words, motor generator MG is incorporated in motored vehicle 100 as an electric motor driving wheel DW.

Electric storage device B is a chargeable and dischargeable, direct current power supply and for example implemented by a nickel metal hydride battery, a lithium ion battery or a similar secondary battery. Electric storage device B supplies inverter 10 with a direct current power. Furthermore electric storage device B is charged by inverter 10 when the vehicle is regeneratively braked. Note that electric storage device B may be implemented by a capacitor of large capacity.

Capacitor C smoothes variation in voltage between power supply line PL and ground line SL. Inverter 10 operates in response to a signal PWI received from ECU 20 to convert a direct current voltage, which is received on power supply line PL, to a 3 phase, alternate current voltage and output the 3 phase, alternate current voltage to motor generator MG. This drives motor generator MG to generate a torque as designated. Furthermore when the vehicle is regeneratively braked, inverter 10 receives a 3 phase alternate current voltage from motor generator MG, converts the alternate current voltage to a direct current voltage in accordance with signal PWI received from ECU 20, and outputs the direct current voltage to electric storage device B.

Motor generator MG is a 3 phase, alternate current, rotating electric machine and implemented for example by a 3 phase, alternate current, synchronous motor generator. Motor generator MG receives a 3 phase alternate current voltage from inverter 10 to generate a torque driving the vehicle. Furthermore, when the vehicle is regeneratively braked, motor generator MG receives a force of rotation from wheel DW to generate and output a 3 phase alternate current voltage to inverter 10.

Temperature sensor 30 detects a motor temperature T of motor generator MG and outputs the detected motor temperature T to ECU 20. Voltage sensor 40 detects a voltage Vm across capacitor C and outputs the detected voltage Vm to ECU 20. Current sensor 50 detects a motor current MCRT flowing to the 3 phase cable connecting inverter 10 to motor generator MG and outputs the detected motor current MCRT to ECU 20.

ECU 20 receives from an external ECU (not shown) a torque control value TR for motor generator MG and a vehicular speed SV. From torque control value TR, vehicular speed SV, motor temperature T received from temperature sensor 30, voltage Vm received from voltage sensor 40, and motor current MCRT received from current sensor 50, ECU 20 generates signal PWI for driving inverter 10, and outputs the generated signal PWI to inverter 10.

Note that torque control value TR is calculated by the external ECU as based on how much the accelerator pedal and the brake pedal are currently depressed and how the vehicle is currently running. Vehicular speed SV is calculated by the external ECU from the number of rotations of wheel DW, that of rotations of motor generator MG, and the like, as detected by a rotation sensor (not shown).

If motor temperature T exceeds a preset threshold value, ECU 20 limits the torque output from motor generator MG. Furthermore if a predetermined condition is established, ECU 20 employs a method, which will be described later, to alleviate, by a predetermined period of time, limiting the torque of motor generator MG. After the predetermined period of time has elapsed, ECU 20 removes alleviating limiting the torque and then activates a signal ARM output to notification unit 25.

When notification unit 25 receives the activated signal ARM from ECU 20, notification unit 25 notifies the driver that alleviating limiting the torque is removed, i.e., limiting the torque is resumed. Notification unit 25 may be a display device providing visual notification, or an audio device providing audible notification.

Figure 2:
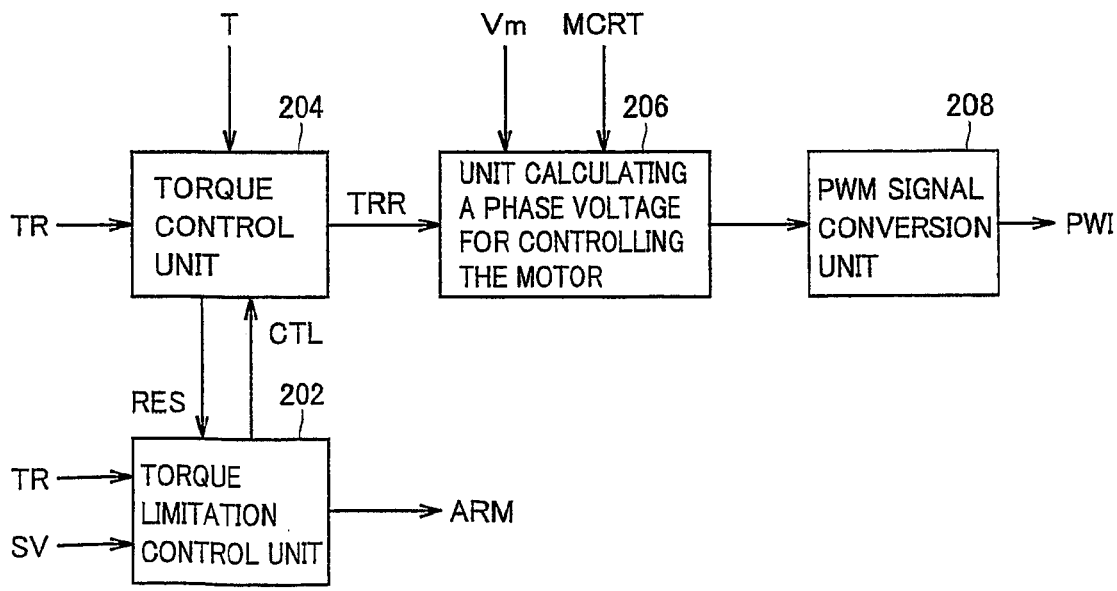
FIG. 2 is a functional block diagram of an ECU shown in FIG. 1.

FIG. 2 is a functional block diagram of ECU 20 shown in FIG. 1. With reference to FIG. 2, ECU 20 includes a torque limitation control unit 202, a torque control unit 204, a unit 206 calculating a phase voltage for controlling the motor, and a PWM signal conversion unit 208.

When a signal RES indicating that torque control unit 204 limits the torque of motor generator MG is active, torque limitation control unit 202 determines from torque control value TR for motor generator MG and vehicular speed SV whether limiting the torque of motor generator MG by torque control unit 204 should be alleviated. If so torque limitation control unit 202 activates for a predetermined period of time a signal CTL output to torque control unit 204.

This predetermined period of time is preset to be an appropriate time allowing the driver to take some approach, such as pulling over to the road's shoulder, turning on a hazard flasher, and the like, while limiting the torque of motor generator MG is alleviated.

Furthermore when the above predetermined period of time has elapsed, torque limitation control unit 202 inactivates signal CTL and activates signal ARM output to notification unit 25 (not shown).

Torque control unit 204 exerts torque limitation control based on motor temperature T of motor generator MG to limit the torque output from motor generator MG. More specifically, when motor generator MG has motor temperature T exceeding a threshold temperature Tth, torque control unit 204 reduces torque control value TR received from the external ECU, and outputs to unit 206 torque control value TR limited as based on motor temperature T, i.e., a torque control value TRR.

Note that herein when torque limitation control unit 202 outputs active signal CTL, torque control unit 204 alleviates a torque control value TRR reduction rate. For example, when signal CTL is active, torque control unit 204 fixes torque control value TRR to be constant. Limiting the torque of motor generator MG is thus alleviated throughout the predetermined period of time for which signal CTL is active.

Furthermore, while the torque limitation control (including alleviating limiting the torque) is exerted, torque control unit 204 activates signal RES output to torque limitation control unit 202.

Unit 206 calculating a phase voltage for controlling the motor receives torque control value TRR from torque control unit 204, voltage Vm from voltage sensor 40 and motor current MCRT from current sensor 50, calculates therefrom a voltage applied to each of the U, V and W phase coils of motor generator MG, and outputs each calculated phase coil voltage to PWM signal conversion unit 208.

PWM signal conversion unit 208 receives each phase coil voltage from unit 206 calculating a phase voltage for controlling the motor, generates therefrom a pulse width modulation (PWM) signal for turning on/off each transistor of inverter 10, and outputs the generated PWM signal as signal PWI to each transistor of inverter 10.

Note that ECU 20 operates to protect motor generator MG such that when motor temperature T exceeds threshold temperature Tth, torque control unit 204 reduces a torque control value for motor generator MG.

However, for example if the vehicle is running uphill and motor temperature T increases, and motor generator MG is limited in torque, then the vehicle can fail to climb up or stop. Accordingly, torque limitation control unit 202 determines the vehicle's state from torque control value TR and vehicular speed SV, and if torque limitation control unit 202 determines that limiting the torque should be alleviated, torque limitation control unit 202 activates signal CTL for a predetermined period of time and thus outputs the signal to torque control unit 204.

Thus, limiting the torque of motor generator MG by torque control unit 204 is alleviated by the predetermined period of time corresponding to the activation of signal CTL.

Alleviating limiting the torque of motor generator MG increases motor generator MG in thermal load. However, alleviating limiting the torque is limited to a prescribed condition based on torque control value TR and vehicular speed SV and is also limited to a predetermined period of time allowing the driver to take some approach, such as pulling over the vehicle to the road's shoulder, turning on a hazard flasher, applying brakes, and the like. Protecting motor generator MG is thus not interrupted.

After the predetermined period of time has elapsed, torque limitation control unit 202 inactivates signal CTL and activates signal ARM. In response, torque control unit 204 resumes limiting the torque and notification unit 25 notifies the driver accordingly.

Figure 3:
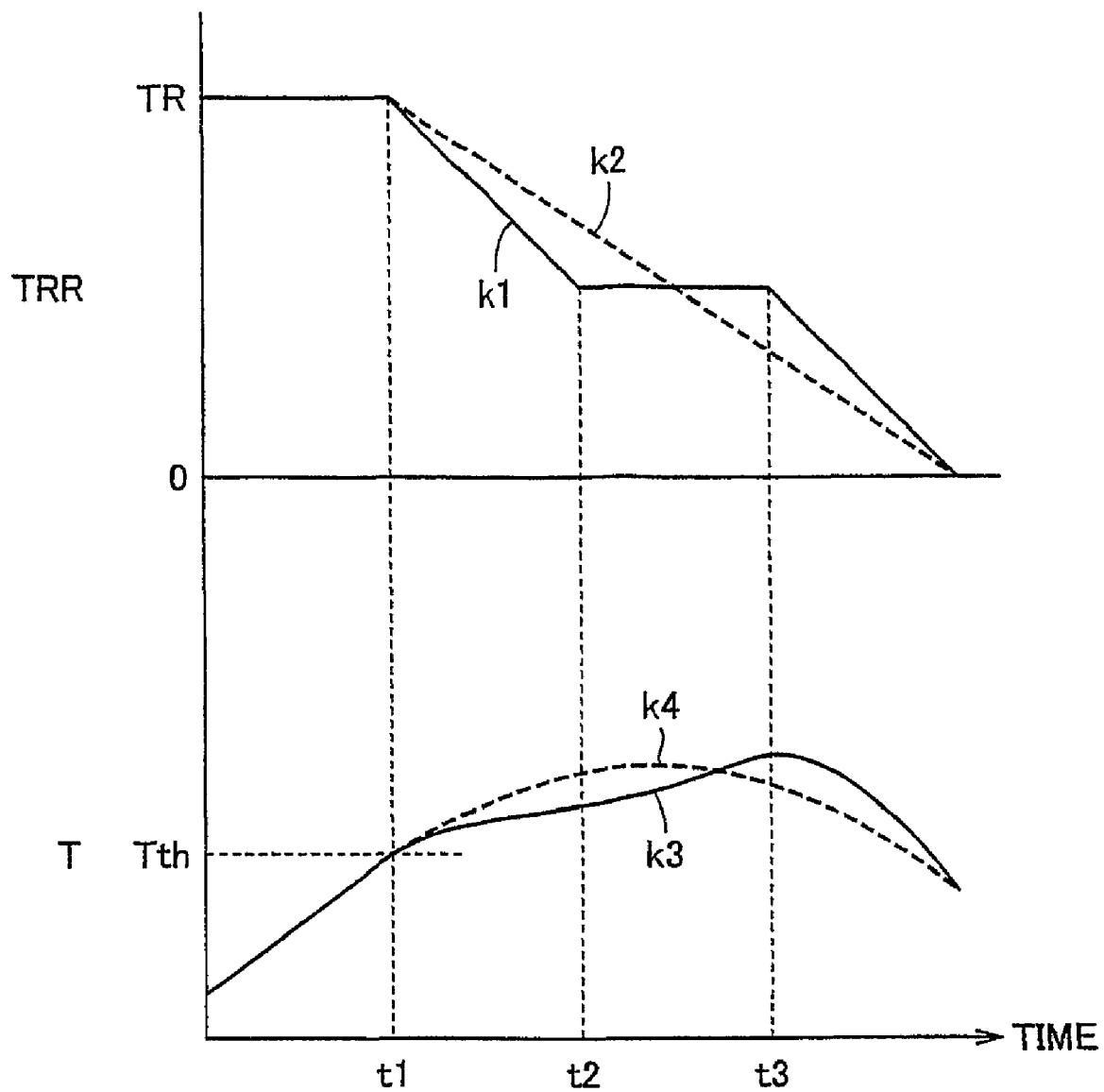
FIG. 3 shows how a torque control value and a motor's temperature vary when a torque is limited.

FIG. 3 represents how torque control value TRR and motor temperature T vary. With reference to FIG. 3, a solid line k1 indicates how torque control value TRR varies with time and a solid line k3 indicates how motor temperature T varies with time. For comparison, one example of how a conventional torque control value varies with time is indicated by a broken line k2 and one example of how a conventional motor temperature varies with time is indicated by a broken line k4.

At time t1 the motor temperature exceeds threshold temperature Tth. In response, torque control value TRR starts to decrease. Accordingly, after time t1, motor temperature T increases at a reduced rate.

At time t2, limiting the torque of motor generator MG is alleviated in accordance with torque control value TR and vehicular speed SV. More specifically, torque control value TRR is controlled to be constant from time t2 for a predetermined period of time or to time t3. Note that while torque control value TRR is fixed (i.e., for times t2-t3), motor temperature T shifts to a tendency to slightly increase.

At time t3, alleviating limiting the torque is removed and thereafter torque control value TRR again decreases. Accordingly after time t3 motor temperature T decreases.

Note that to prevent motor temperature T from significantly increasing as limiting the torque is alleviated, it is preferable to reduce a torque control value at a rate larger than conventional as indicated by broken line k2 for periods (of times t1-t2, and t3 and thereafter, respectively) other than that for which limiting a torque is alleviated. Thus in times t1-t2 motor temperature T increases in a more suppressed manner than conventional. As such, if limiting the torque is alleviated in times t2-t3, motor temperature T (indicated by solid line k4) can be prevented from significantly increasing as compared with the conventional motor temperature (indicated by solid line k3).

Figure 4:
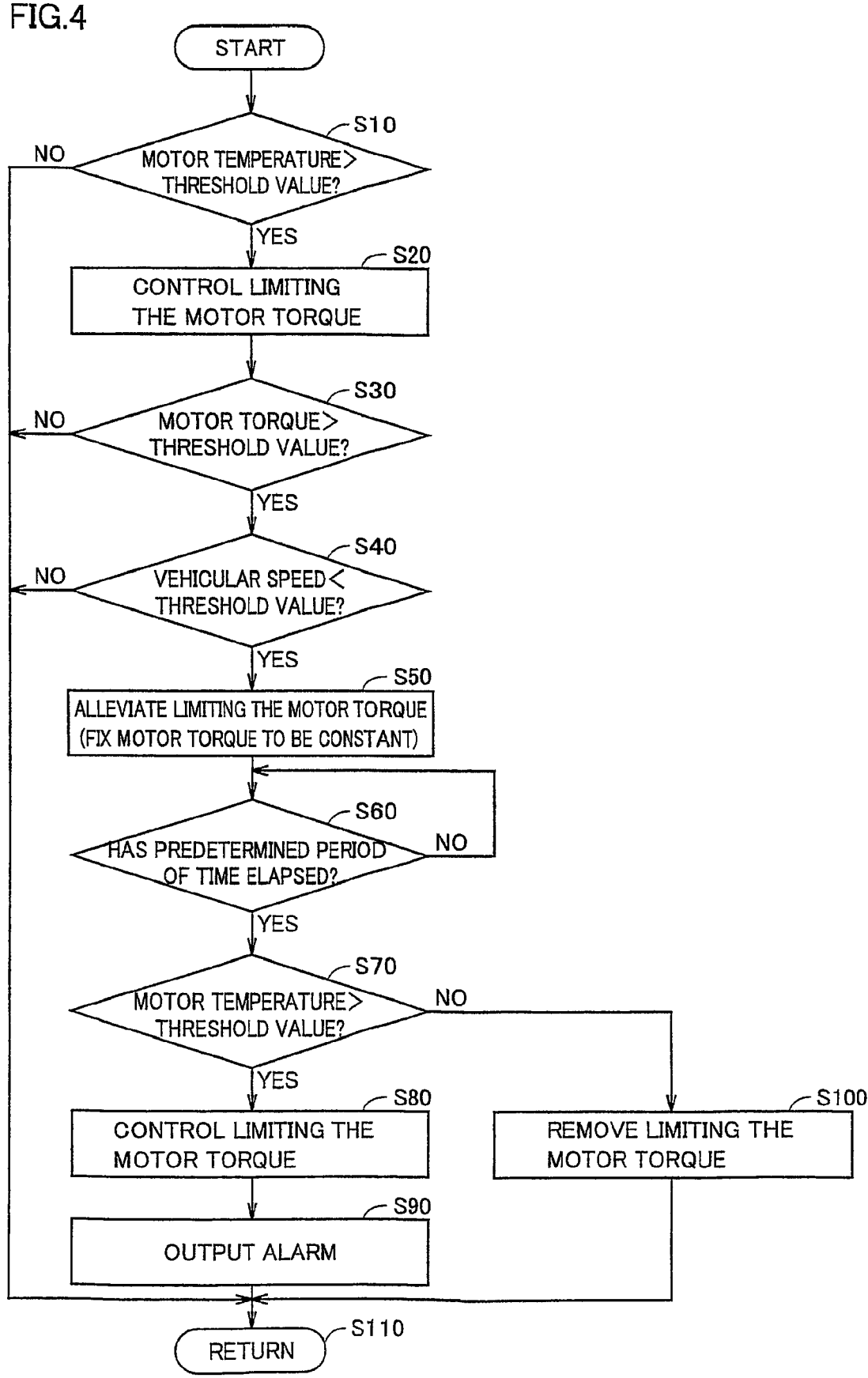
FIG. 4 is a flowchart of how a torque is limited, as controlled by the ECU shown in FIG. 1.

FIG. 4 is a flowchart of how ECU 20 shown in FIG. 1 exerts the torque limitation control. Note that the process shown in this flowchart is invoked from a main routine and executed for each fixed time or whenever a predetermined condition is established.

With reference to FIG. 4, ECU 20 obtains motor temperature T of motor generator MG from temperature sensor 30 and determines whether motor temperature T exceeds threshold temperature Tth (step S10). If not (NO at step S10) ECU 20 does not perform a subsequent process and returns to the main routine (step S110).

If at step S10 ECU 20 determines that motor temperature T is higher than threshold temperature Tth (YES at step S10), ECU 20 exerts the torque limitation control to limit the torque of motor generator MG, as has been described above (step S20).

While the torque limitation control is exerted, ECU 20 determines whether the torque of motor generator MG is larger than a preset threshold value TRth (step S30). More specifically, ECU 20 determines whether torque control value TRR is larger than threshold value TRth, as described above. If not (NO at step S30) ECU 20 proceeds to step S110.

If at step S30 ECU 20 determines that the torque of motor generator MG is larger than threshold value TRth (YES in step S30), ECU 20 determines whether vehicular speed SV is smaller than a preset threshold value SVth (step S40). If not (NO at step S40) ECU 20 proceeds to step S110.

If at step S40 ECU 20 determines that vehicular speed SV is smaller than threshold value SVth (YES at step S40), ECU 20 alleviates limiting the torque of motor generator MG (step S50). More specifically, ECU 20 thereafter does not decrease the torque control value for motor generator MG and controls the torque of motor generator MG to have a constant value.

ECU 20 thus starts alleviating limiting the torque and thereafter when a predetermined period of time elapses (YES at step S60), ECU 20 determines whether motor temperature T exceeds threshold temperature Tth (step S70). If so (YES at step S70) ECU 20 resumes the torque limitation control (step S80). ECU 20 then activates signal ARM output to notification unit 25, and notification unit 25 outputs an alarm indicating that the torque limitation control is resumed (step S90).

If at step S70 ECU 20 determines that motor temperature T does not exceed threshold temperature Tth (NO at step S70), ECU 20 removes limiting the torque of motor generator MG (step S100).

Thus in the present embodiment, after torque control unit 204 starts limiting the torque of motor generator MG, torque limitation control unit 202 activates signal CTL in accordance with the vehicle's state only for a predetermined period of time and outputs the signal to torque control unit 204. Thus, after limiting the torque of motor generator MG is started, limiting the torque is alleviated for a predetermined period of time in accordance with the vehicle's state.

Thus in accordance with the present embodiment, when a limited torque results in a vehicle being in a state (such as failing to climb up or stop because of insufficient torque when the vehicle is running uphill) higher in priority in that it should be avoided, the driver can take some approach, such as pulling over to the road's shoulder, turning on a hazard flasher, applying brakes, and the like. This can provide an increased possibility of avoiding such state higher in priority in that it should be avoided.

Furthermore, limiting the torque can be alleviated in accordance with the vehicle's state only for a predetermined period of time, and protecting motor generator MG is not interrupted. Furthermore when alleviating limiting the torque is removed, notification unit 25 can output an alarm to the driver to ensure that the driver is notified that the torque is more severely limited.

Note that the above embodiment indicates a motored vehicle that drives wheel DW by motor generator MG, the present invention is also applicable to hybrid vehicles also having an internal combustion engine mounted therein as a power source, fuel cell vehicles having electric storage device B replaced with a fuel cell mounted therein as a direct current power supply.

Furthermore between electric storage device B and inverter 10 there may be provided an upconverter receiving a direct current voltage from electric storage device B, upconverting, the voltage and supplying the upconverted voltage to inverter 10.

It should be noted that in the above description motor generator MG, torque control unit 204, and torque limitation control unit 202 correspond in the present invention to an "electric motor," a "torque limitation unit" and a "torque limitation alleviation unit," respectively.

It should be understood that the embodiment disclosed herein is illustrative and non-restrictive in any respect. The scope of the present invention is defined by the terms of the claims, rather than the description above, and is intended to include any modifications within the scope and meaning equivalent to the terms of the claims.

The invention claimed is:

1. An electric motor control apparatus controlling an electric motor generating a force driving a vehicle, comprising:
a torque limitation device to limit a torque of said electric motor when a motor temperature exceeds a preset threshold temperature value; and
a torque limitation alleviation device to output an instruction to said torque limitation device to pause limiting the torque and to maintain the torque of the electric motor at a constant value for a predetermined period of time,
wherein said predetermined period of time is a period of time preset as a time allowing a driver of said vehicle to handle a state of said vehicle caused by said limiting of said torque.

2. The electric motor control apparatus according to claim 1, wherein after said predetermined period of time has elapsed, said torque limitation alleviation device outputs an instruction to said torque limitation device to resume the limiting of said torque.

3. The electric motor control apparatus according to claim 2, further comprising a notification device to output an alarm to a driver of said vehicle when limiting of said torque is resumed.

4. A motored vehicle comprising:
an electric motor generating a force driving the vehicle;
a wheel mechanically coupled with an output shaft of said electric motor; and
the electric motor control apparatus of claim 1.

5. The electric motor control apparatus according to claim 1, wherein said torque limitation alleviation device outputs said instruction to said torque limitation device when said electric motor provides a torque exceeding a first threshold value and said vehicle has a speed smaller than a second threshold value.

6. An electric motor control apparatus controlling an electric motor generating a force driving a vehicle, comprising:
a torque limitation device to limit a torque of said electric motor; and
a torque limitation alleviation device to output an instruction to said torque limitation device for a predetermined period of time to alleviate said limiting of said torque in accordance with a state of said vehicle after said torque limitation device starts said limiting of said torque of said electric motor,
wherein said predetermined period of time is a period of time preset as a time allowing a driver of said vehicle to handle a state of said vehicle caused by said limiting of said torque, and
wherein said torque limitation alleviation device outputs said instruction to said torque limitation device when said electric motor provides a torque exceeding a first threshold value and said vehicle has a speed smaller than a second threshold value.

7. A method of controlling an electric motor generating a force driving a vehicle, comprising the steps of:
- measuring a motor temperature;
- when the motor temperature exceeds a preset threshold temperature value, limiting a torque of said electric motor; and
- pausing limiting the torque and maintaining the torque of the electric motor at a constant value for a predetermined period of time,
- wherein said predetermined period of time is a period of time preset as a time allowing a driver of said vehicle to handle a state of said vehicle caused by said limiting of said torque.

8. The method according to claim 7, further comprising the step of resuming limiting of said torque after said predetermined period of time has elapsed.

9. The method according to claim 8, further comprising the step of outputting an alarm to a driver of said vehicle when limiting of said torque is resumed.

10. The method according to claim 7, wherein the step of pausing comprises the sub-steps of:
- determining whether said electric motor provides a torque exceeding a first threshold value;
- determining whether said vehicle has a speed smaller than a second threshold value; and
- pausing limiting of said torque for said predetermined period of time when said electric motor provides said torque exceeding said first threshold value and said vehicle has said speed smaller than said second threshold value.

11. A method of controlling an electric motor generating a force driving a vehicle, comprising the steps of:
- limiting a torque of said electric motor; and
- after the step of limiting is started, alleviating said limiting of said torque for a predetermined period of time in accordance with a state of said vehicle, comprising the sub-steps of:
- determining whether said electric motor provides a torque exceeding a first threshold value;
- determining whether said vehicle has a speed smaller than a second threshold value; and
- alleviating said limiting of said torque for said predetermined period of time when said electric motor provides said torque exceeding said first threshold value and said vehicle has said speed smaller than said second threshold value,
- wherein said predetermined period of time is a period of time preset as a time allowing a driver of said vehicle to handle a state of said vehicle caused by said limiting of said torque.

* * * * *